Oct. 16, 1934.  A. WINTHER  1,977,600
ELECTROMAGNETIC POLE
Filed March 7, 1934  2 Sheets-Sheet 1
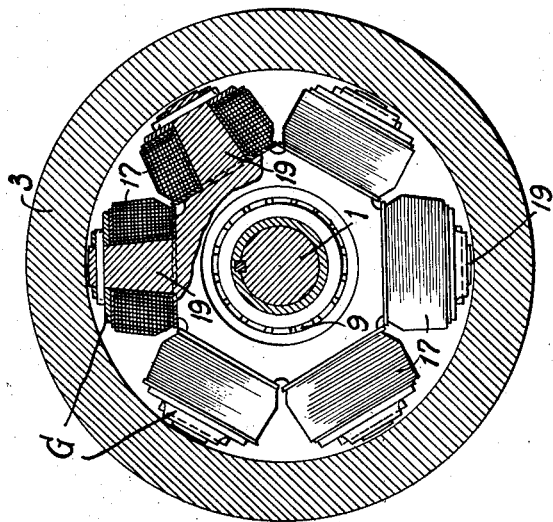
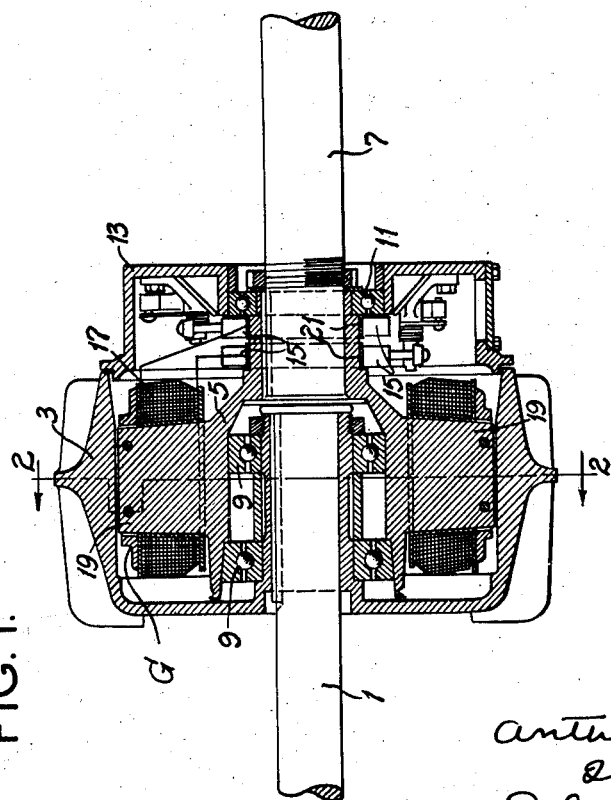
Anthony Winther,
Inventor.
Delos G. Haynes,
Attorney.

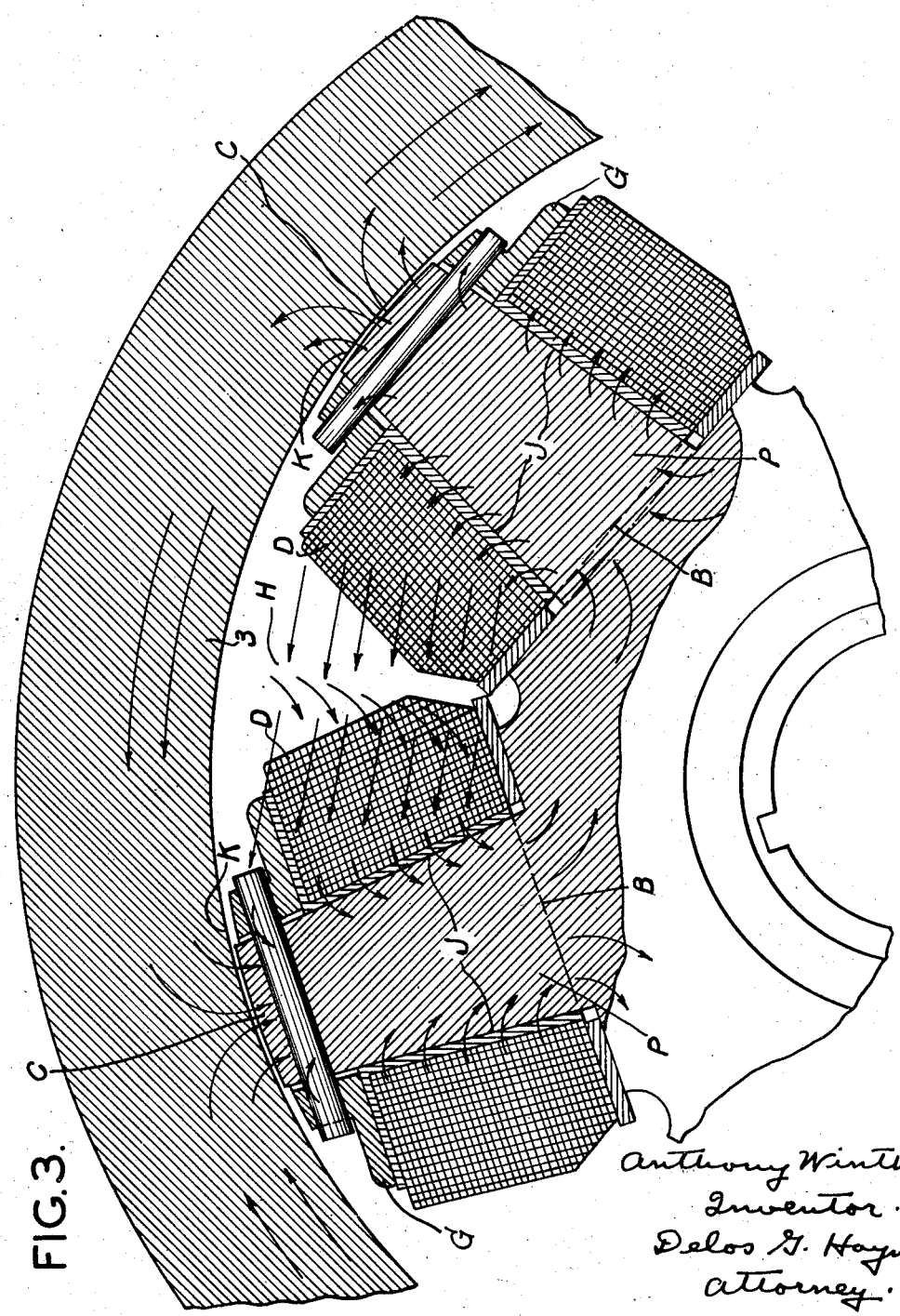

Patented Oct. 16, 1934

1,977,600

UNITED STATES PATENT OFFICE 1,977,600

ELECTROMAGNETIC POLE

Anthony Winther, Kenosha, Wis.

Application March 7, 1934, Serial No. 714,437

REISSUED

5 Claims. (Cl. 172—284)

This invention relates to electro-magnetic poles, and with regard to certain more specific features, to such poles, particularly for eddy current electric clutches and the like.

Among the several objects of the invention may be noted the provision of a new and improved electro-magnetic pole for increasing the efficiency of eddy current electric clutches; the provision of a device of this class which shall reduce to a minimum the slip between the driving and driven elements of such clutches; the elimination in an eddy current clutch of the requirement for locking together the driving and driven members by means of a friction or jaw clutch when substantially direct drive is required; and the provision of apparatus of the class described which shall be simple in form and dependable in operation. Other objects will be in part obvious and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawings, in which is illustrated one of various possible embodiments of the invention, Fig. 1 is a longitudinal section of a device embodying the invention;

Fig. 2 is a cross section taken on line 2—2 of Fig. 1, parts being shown in elevation; and, Fig. 3 is an enlarged fragmentary section illustrating certain principles of operation.

Similar reference characters indicate corresponding parts throughout the several views of the drawings.

Reference is made herein primarily, to clutches of the type using eddy current members of homogeneous materials such as steel rings or drums, permitting variations in slip by regulating excitation of a magnetic member. In Fig. 1 is shown such a device comprising a driver 1 to which is keyed an eddy current member 3 of homogeneous material such as steel and having a cup shape surrounding a driven electro-magnetic member 5, the latter being connected to the driven member 7.

Pilot bearings 9 permit relative motion between the eddy current member 3 and the electro-magnetic member 5. A bearing 11 supports the driven elements in a frame 13, the latter supporting brushes 15 which are connected to an outside circuit and bear on slip rings 21. Windings 17 on poles 19 of the magnetic member 5 are connected to the slip rings 21 and are thus energized. The current from the outside source thus energizes the coils 17 so that an electro-magnetic field emanates from or enters the poles 19, depending upon the direction of winding, and which passes a gap between said poles and the eddy current member 3. Thus a magnetic drag is effected between the member 3 and the member 5 according to the intensity of the field. The weaker the field, the more is the slip because of lower eddy currents and the less is the drag effect.

Heretofore, it has been the practice to increase the strength of the electro-magnetic field so as to reduce slippage and approach synchronism. However, the synchronous condition was only very approximate and it was the practice to use a friction or jaw clutch under the desired direct drive condition. For example, see United States Patent 1,825,934 issued to J. Bing on October 6, 1931.

The usual method of making magnetic poles of this class in dynamos and the like is to decrease the flux density crossing the air gap to a value much smaller than that permitted by the paramagnetic part of the circuit. This was done on the correct theory that the lower the density, the less ampere turns will be required to force the total flux across the air gap. On dynamos and motors having separate path inductors, this scheme produces the best and most efficient results. However, when using a solid rotor, I have discovered the theory to be entirely different.

Referring to Fig. 3; if pole P were straight radially, that is, of equal cross sectional area laterally at B and C, the clutch would require a considerable excess of exciting current in coil D in order that the slip between pole face C and drum 3 might be brought to the low value of the order of that obtaining in the commercial run of electric induction motors. This slip is approximately of the order of one hundred feet per minute.

I have discovered that the greatest efficiency in the use of exciting current on solid inductor eddy current clutches is obtained when the pole area at C is approximately 30% less than at B.

For example, in a given test, with a straight pole and paramagnetic pole cap having an area of 50% greater than that of the bottom of the pole waist, the slip was 1500 feet per minute at section C when the flux density was of the order of 80,000 lines per square inch at section B. By removing the pole end of paramagnetic materials and extending the pole waist C to form the identical air gap as used in the first test, and using a brass coil cap G, the slip with the same ampere turns as used before was reduced to 360 feet per minute. When the area at C was reduced to 30% less than at B, the slip was reduced to 30 feet per minute. On a ten horsepower clutch operating at 1150 R. P. M. this last-named slip amounts to only 10 R. P. M., or less than 1% of the power transmitted is lost. Hence there is no longer need for a friction clutch or jaw clutch as the drive is brought so close to synchronism as to make any loss negligible.

The cause of the above effect may be due to the fact that the slip factor is a function of the flux density at the air gap. The commonly acknowledged flux leakage at H across between poles is 25% to 30% in a well designed field arrangement. As these magnets must be worked at a high density, coming near the saturation point of the steel, it seems that the leakage across H will prevent saturation of area C unless there is sufficient taper to the pole piece to provide sufficient area at B. The area of B must pass sufficient flux to practically saturate C and provide flux for the leakage path also.

On the other hand if the taper of the pole is too steep, the leakage will increase from the pole waist sides J to the inductor surface K, and rob the active pole end C of usable flux.

I have found that there is a relation between the length of the pole and area at C and B. If the length of pole waist from section B at the base of the surrounding coil to section C at the end is less than the square root of the pole end area at C, the drive effects are quickly reduced as the relative distance B to C is reduced. In other words, the slip between driver and driven member is increased as the ratio of distance between B and C to area of pole end C is reduced.

In view of the above, it will be seen that the several objects of the invention are achieved and other advantageous results attained.

As many changes could be made in carrying out the above constructions without departing from the scope of the invention, it is intended that all matter contained in the above description or shown in the accompanying drawings shall be interpreted as illustrative and not in a limiting sense.

I claim:

1. In eddy current inductor apparatus, an electro-magnetic pole comprising a waist, said waist tapering inwardly from its base end to its gap end, a winding surrounding said waist, the length of said pole waist through said winding and to the section at the magnetic gap being greater than the square root of the pole end area at said gap.

2. An eddy current electric clutch comprising an eddy current member, an electro-magnetic member associated therewith, poles on said electro-magnetic member so related to the eddy current member as to form air gaps, said poles having pole faces at said gaps, said poles having waists, windings about said waists, said pole faces at said gaps being substantially 30% less in area than the areas of the poles at the bases of said windings.

3. An eddy current electric clutch comprising an eddy current member, an electro-magnetic member associated therewith, poles on said electro-magnetic member so related to the eddy current member as to form air gaps, said poles having pole faces at said gaps, said poles having waists, windings about said waists, said pole faces at said gaps being substantially 30% less in area than the areas of the poles at the bases of said windings, and the lengths of the pole waists through the coils to the pole faces being greater than the square roots of the pole end areas.

4. In an eddy current electric clutch, an eddy current member, an electro-magnetic member having poles, said poles having faces adjacent the eddy current member, and said poles having waists, electric windings on said waists, the relationship between the pole end areas and the pole base areas being such as to taper the poles through the waists down to the pole end areas such that the flux leakage between poles is accommodated by the poles and effects substantially flux saturation at the pole ends by means of the flux which passes through the eddy current member, and a non-magnetic collar about each pole end.

5. In an eddy current electric clutch, an eddy current member, an electro-magnetic member having poles, said poles having faces adjacent the eddy current member, and said poles having waists, electric windings on said waists, the relationship between the pole end areas and the pole base areas being such as to taper the poles through the waists down to the pole end areas such that the flux leakage between poles is accommodated by the poles, and to effect substantially flux saturation at the pole ends by means of the flux which passes through the eddy current member.

ANTHONY WINTHER.